United States Patent
Tanaka et al.

(10) Patent No.: US 8,280,237 B2
(45) Date of Patent: Oct. 2, 2012

(54) COGENERATION SYSTEM USING SURPLUS ELECTRICAL CURRENT

(75) Inventors: Yoshikazu Tanaka, Osaka (JP); Kiyoshi Taguchi, Osaka (JP); Hideo Ohara, Osaka (JP)

(73) Assignee: Panasonic Corporation, Osaka (JP)

(*) Notice: Subject to any disclaimer, the term of this patent is extended or adjusted under 35 U.S.C. 154(b) by 440 days.

(21) Appl. No.: 12/602,133

(22) PCT Filed: May 28, 2008

(86) PCT No.: PCT/JP2008/001336
§ 371 (c)(1),
(2), (4) Date: Nov. 27, 2009

(87) PCT Pub. No.: WO2008/146490
PCT Pub. Date: Dec. 4, 2008

(65) Prior Publication Data
US 2010/0178043 A1  Jul. 15, 2010

(30) Foreign Application Priority Data
May 28, 2007 (JP) ................. 2007-139863

(51) Int. Cl.
*F28D 7/00* (2006.01)
*A47J 31/00* (2006.01)
*F24H 1/18* (2006.01)

(52) U.S. Cl. ......... 392/496; 392/441; 392/465; 392/307

(58) Field of Classification Search .................. 392/307, 392/400, 441, 465, 496
See application file for complete search history.

(56) References Cited

U.S. PATENT DOCUMENTS

| 5,617,504 | A  | * | 4/1997 | Sciacca et al. | 392/307 |
| 6,418,275 | B1 | * | 7/2002 | Yang | 392/441 |
| 6,562,088 | B2 | * | 5/2003 | Ukai et al. | 48/197 R |
| 7,020,387 | B1 | * | 3/2006 | Andrakin | 392/465 |
| 7,195,657 | B2 | * | 3/2007 | Ukai et al. | 48/61 |

FOREIGN PATENT DOCUMENTS

| JP | 59-120815 | 8/1984 |
| JP | 5-126402 | 5/1993 |

(Continued)

*Primary Examiner* — Thor Campbell
(74) *Attorney, Agent, or Firm* — McDermott Will & Emery LLP

(57) ABSTRACT

A cogeneration system of the present invention includes: a fuel cell (1) configured to generate electricity and heat; a hot water tank (2) configured to store hot water having recovered the heat generated by the fuel cell (1); a heat exchanger (7) configured to transfer the heat generated by the fuel cell (1) to the hot water; a hot water passage (8) that is a first heat medium passage configured such that the heat is transferred to the hot water by the heat exchanger (7) and the hot water flows into the hot water tank (2); a heat medium supplier (9) configured to cause the heat medium to flow through the first heat medium passage (8); a hot water supplying passage (11) through which the hot water stored in the hot water tank (2) is supplied to the heat load; an electric power consuming heater (12) configured to heat the hot water flowing through the hot water supplying passage (11) toward the heat load by consuming surplus electric power of the fuel cell (1) and commercial electric power; and a second heat medium passage (A) configured such that the hot water is heated by the electric power consuming heater (12) and flows into the hot water tank (2).

5 Claims, 12 Drawing Sheets

FOREIGN PATENT DOCUMENTS

| | | |
|---|---|---|
| JP | 2002-042840 | 2/2002 |
| JP | 2002-042840 A | 2/2002 |
| JP | 2002-213303 | 7/2002 |
| JP | 2004-150646 | 5/2004 |
| JP | 2005-012906 | 1/2005 |
| JP | 2005-038676 | 2/2005 |
| JP | 2005-214452 | 8/2005 |
| JP | 2006-329609 | 12/2006 |

* cited by examiner

COGENERATION SYSTEM USING SURPLUS ELECTRICAL CURRENT

RELATED APPLICATIONS

This application is the U.S. National Phase under 35 U.S.C. §371 of International Application No. PCT/JP2008/001336, filed on May 28, 2008, which in turn claims the benefit of Japanese Application No. 2007-139863, filed on May 28, 2007, the disclosures of which Applications are incorporated by reference herein.

TECHNICAL FIELD

The present invention relates to a cogeneration system including a combined heat and power unit configured to generate electric power and heat and a heat accumulator configured to store exhaust heat from the combined heat and power unit.

BACKGROUND ART

A cogeneration system using a fuel cell or an engine can recover heat generated at the same time as electric power generation as hot water to effectively utilize an energy and is attracting attention as a highly efficient distributed power supply. For example, as shown in FIG. 12, in the case of a fuel cell cogeneration system, normally, heat generated by a fuel cell 21 is recovered by cooling water in a cooling water passage 22, and the cooling water exchanges the heat with hot water in a hot water passage 23 via a heat exchanger 24. The hot water heated in the heat exchanger 24 is stored in the hot water tank 27 as heated water, and the heated water is supplied from an exit of the hot water tank 27 through a hot water supplying passage 28 to a heat load in accordance with a heat demand of the heat load. Proposed is that in this fuel cell cogeneration system, a surplus electric power heater 25 configured to heat the hot water using surplus electric power which is a part of electric power generated by the fuel cell 21 and is unconsumed by an electric power load is disposed on a hot water passage 25 located downstream of the heat exchanger 24, and an auxiliary heat source 29 is disposed on the hot water supplying passage 28 as a backup in a case where the amount of heated water in the hot water tank 27 is not enough with respect to the heat demand of the heat load (see Patent Document 1 for example).

Patent Document 1: Japanese Laid-Open Patent Application Publication 2005-12906

DISCLOSURE OF THE INVENTION

Problems to be Solved by the Invention

In the cogeneration system described in Patent Document 1, normally, an output of a hot water pump 26 is controlled to adjust a temperature of the hot water. However, this control of the output of the hot water pump 26 is difficult since it is necessary to deal with not only the change in the amount of heat generated by the fuel cell 21 due to the change in the amount of electric power generated by the fuel cell 21 but also the change in the amount of heat generated by the surplus electric power heater 25 due to the change in the amount of surplus electric power. In addition, although it is desirable that the cogeneration system includes the auxiliary heat source 29 as the backup in the case where the heated water in the hot water tank 27 is not enough with respect to the heat demand of the heat load, this causes increases in cost and size.

The present invention was made to solve the above conventional problems, and an object of the present invention is to provide a cogeneration system configured to reduce the difficulty of the control of the hot water pump due to the change in the amount of heat generated by the surplus electric power heater and not to require an additional auxiliary heat source.

Means for Solving the Problems

To achieve the above object, a cogeneration system of the present invention includes: a combined heat and power unit configured to generate electricity and heat; a heat accumulator configured to store a heat medium having recovered the heat generated by the combined heat and power unit; a heat exchanger configured to transfer the heat generated by the combined heat and power unit to the heat medium; a first heat medium passage configured such that the heat is transferred to the heat medium by the heat exchanger and the heat medium flows into the heat accumulator; a heat medium supplier configured to cause the heat medium to flow through the first heat medium passage; a heat supplying passage through which the heat medium stored in the heat accumulator is supplied to the heat load; an electric power consuming heater configured to heat the heat medium flowing through the heat supplying passage toward the heat load by consuming surplus electric power of the combined heat and power unit and commercial electric power; and a second heat medium passage configured such that the heat medium is heated by the electric power consuming heater and flows into the heat accumulator. Here, "electric power consuming heater configured to heat the heat medium by consuming surplus electric power and commercial electric power" denotes that the electric power consuming heater consumes both the surplus electric power and the commercial electric power, but a period (timing) when the surplus electric power and the commercial electric power are consumed is not especially limited. To be specific, the electric power consuming heater may consume the surplus electric power and the commercial electric power at the same time or may consume the surplus electric power and the commercial electric power at different periods.

The cogeneration system may further include: a first heat medium supplying passage through which the heat medium is supplied from a heat medium source to the heat accumulator; a second heat medium supplying passage configured to branch off from the first heat medium supplying passage to be connected to the heat supplying passage; a mixing valve disposed on a portion where the heat supplying passage and the second heat medium supplying passage are connected to each other and configured to mix the heat medium flowing through the heat supplying passage with the heat medium from the second heat medium supplying passage; a bypass passage configured to connect the second heat medium passage and a portion of the heat supplying passage which portion is located on the heat accumulator side of the mixing valve; and a bypass valve disposed on the bypass passage, wherein the second heat medium passage may be constituted by a passage extending from the heat accumulator through the first heat medium supplying passage, the second heat medium supplying passage, the bypass passage, and the heat supplying passage to the heat accumulator.

The cogeneration system may further include: a flow rate detector disposed on a portion of the hot water supplying passage which portion is located on the heat load side of the mixing valve and configured to detect flow of the heat medium; and a controller, wherein the controller may cause the bypass valve to close in a case where the flow rate detector detects the flow of the heat medium and open in a case where the flow rate detector does not detect the flow of the heat medium.

The cogeneration system may further include: a first heat medium supplying passage through which the heat medium is supplied from a heat medium source to the heat accumulator; a second heat medium supplying passage configured to branch off from the first heat medium supplying passage to be connected to the heat supplying passage; and a three-way valve disposed on a portion where the second heat medium supplying passage and the heat supplying passage are connected to each other, wherein: the three-way valve may have two operating modes that are a mode A in which a portion of the heat supplying passage which portion is located on the heat accumulator side of the three-way valve and the second heat medium supplying passage are connected to a portion of the heat supplying passage which portion is located on the heat load side of the three-way valve and a mode B in which the portion of the heat supplying passage which portion is located on the heat accumulator side of the three-way valve and the second heat medium supplying passage are connected to each other and are not connected to the portion of the heat supplying passage which portion is located on the heat load side of the three-way valve; and the heat supplying passage may be formed in a case where the three-way valve switches to the mode A, and the second heat medium passage may be formed in a case where the three-way valve switches to the mode B.

The cogeneration system may further include: a heat demand detector configured to detect heat demand of the heat load; and a controller, wherein: the controller may be configured to cause the three-way valve to switch to the mode A in a case where the heat demand detector detects the heat demand and switch to the mode B in a case where the heat demand detector does not detect the heat demand.

The above object, other objects, features and advantages of the present invention will be made clear by the following detailed explanation of preferred embodiments with reference to the attached drawings.

Effects of the Invention

In accordance with a cogeneration system of the present invention, controllability of a heat medium supplier improves, and lacking heat of a heat medium supplied from a heat accumulator to a heat load can be compensated using heat of an electric power consuming heater configured to perform heating by consuming surplus electric power and/or commercial electric power without providing an additional auxiliary heat source.

EXPLANATION OF REFERENCE NUMBERS

Figure 1:
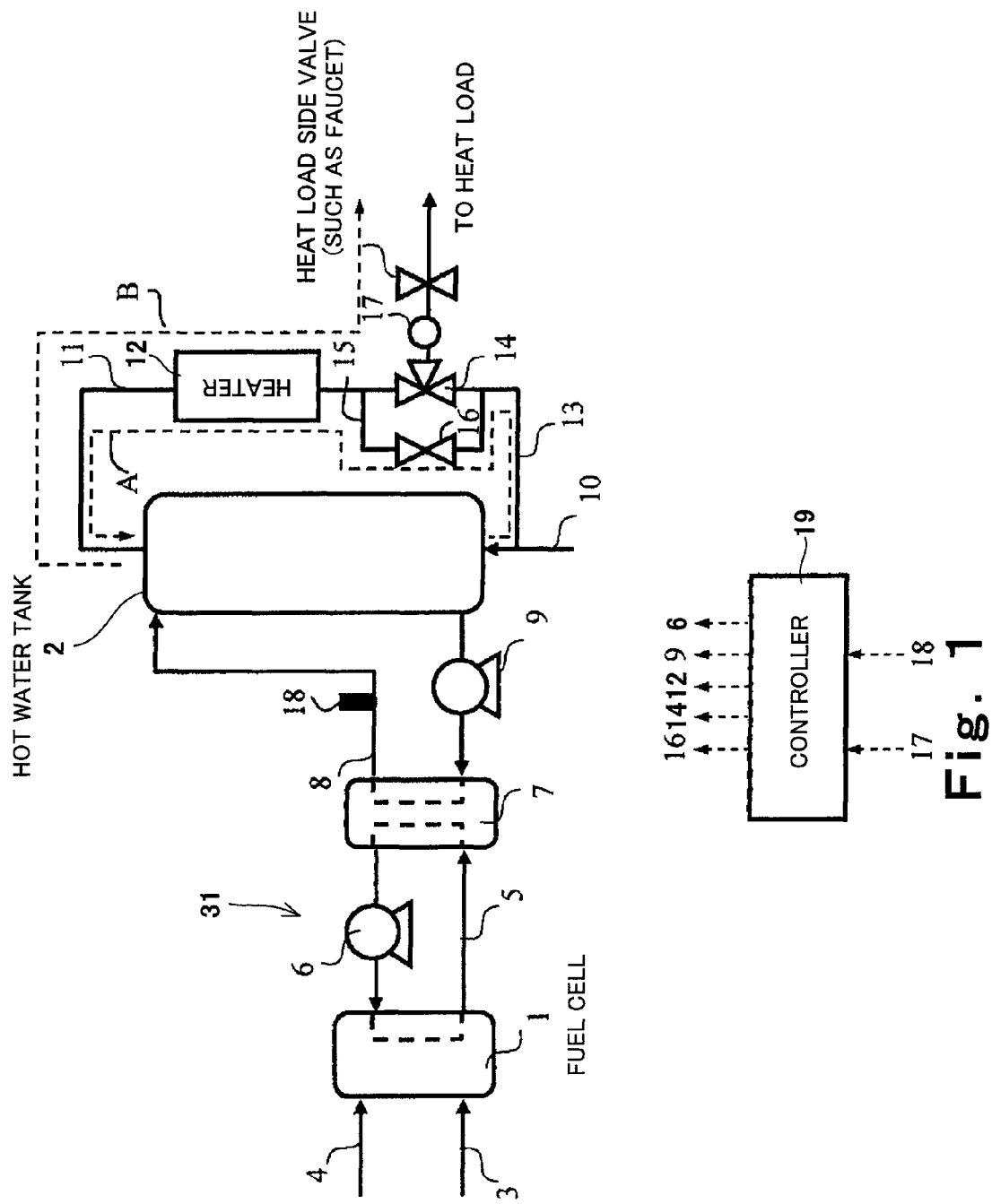
FIG. 1 is a block diagram showing a configuration example of a cogeneration system according to Embodiment 1 of the present invention.

1 fuel cell
2 hot water tank
3 fuel gas passage
4 oxidizing gas passage
5 cooling water passage
6 cooling water supplier
7 heat exchanger
8 hot water passage
9 hot water supplier
10 first water supplying passage
11 hot water supplying passage
12 heater
13 second water supplying passage
14 mixing valve
15 bypass passage
16 bypass valve
17 flow rate detector
18 temperature detector
19 controller
31 heat transfer system
32 output controller
33 DC/DC converter
34 inverter
35, 39 electric wire
36 interconnection point
37 commercial power supply
38 electric power load
40 current detector
51 hot water supplier
52 three-way valve
53 third water supplying passage
54 on-off sensor
55 on-off valve

BEST MODE FOR CARRYING OUT THE INVENTION

Hereinafter, preferred embodiments of the present invention will be explained in reference to the drawings. In the drawings, the same reference numbers are used for the same or corresponding components, and a repetition of the same explanation is avoided.

Embodiment 1

FIG. 1 is a system configuration diagram showing a cogeneration system according to Embodiment 1 of the present invention.

The cogeneration system according to the present embodiment includes: a fuel cell 1 that is one example of a combined heat and power unit of the present invention and is configured to generate electric power using a fuel gas and an oxidizing gas; a hot water tank 2 that is one example of a heat accumulator of the present invention and is configured to store hot water that is one example of a heat medium of the present invention; a fuel gas passage 3 through which the fuel gas supplied to the fuel cell 1 flows; an oxidizing gas passage 4 through which the oxidizing gas supplied to the fuel cell 1 flows; a cooling water passage 5 through which cooling water for recovering heat generated by electric power generation of the fuel cell 1 to cool down the fuel cell 1 flows; a cooling water supplier 6 configured to cause the cooling water in the cooling water passage 5 to flow; a heat exchanger 7 disposed on the cooling water passage 5 to carry out heat exchange between the cooling water and the hot water to cause the hot water to recover heat; a hot water passage 8 that is a first heat medium passage of the present invention and connected to the heat exchanger 7 and through which the hot water flows; a hot water supplier 9 disposed on the hot water passage 8 to cause the hot water in the hot water passage 8 to flow; a first water supplying passage 10 that is a first heat medium supplying passage of the present invention and through which unheated water is supplied from a water source (such as city water) to a lower portion of the hot water tank 2; a hot water supplying passage 11 that is a heat supplying passage B of the present invention and through which the hot water in the hot water tank 2 is supplied to the heat load; an electric power consuming heater (hereinafter simply referred to as "heater") 12 disposed on the hot water supplying passage 11 to perform heating by consuming surplus electric power of the present invention and commercial electric power; a second water supplying passage 13 that is a second heat medium supplying passage of the present invention and is configured to branch off from the first water supplying passage 10 to be connected to the hot water supplying passage 11; a mixing valve 14 disposed at a connection portion where the hot water supplying passage 11 and the second water supplying passage 13 are connected to each other; a bypass passage 15 configured to bypass the mixing valve 14; a bypass valve 16 disposed on the bypass passage 15 and constituted by an on-off valve; a flow rate detector 17 configured to detect a flow rate of the hot water supplied through the mixing valve 14 to the heat load; a temperature detector 18 configured to detect a temperature of the hot water in the hot water passage 8 located downstream of the heat exchanger 7; and a controller 19 configured to control various operations of the cogeneration system. In the above configuration, a second heat medium passage A of the present invention is constituted by the first water supplying passage 10, the second water supplying passage 13 that is the second heat medium supplying passage, the bypass passage 15, and the hot water supplying passage 11 that is the heat supplying passage of the present invention. To be specific, the second heat medium passage A is constituted by a passage configured to branch off from the first water supplying passage 10 and reach the hot water tank 2. Specifically, the passage is configured such that the heat medium from the first water supplying passage 10 flows through the second water supplying passage 13, the bypass passage 15, and the hot water supplying passage 11 to the hot water tank 2. In addition, the cooling water passage 5, the cooling water supplier 6, and the heat exchanger 7 constitutes a heat transfer system 31.

The hot water tank 2 is configured as a so-called stacked boil-up system. Specifically, the hot water passage 8 is connected to an upper portion and lower portion of the hot water tank 2. The hot water supplier 9 is disposed such that a suction port thereof is located on a connection portion side where the hot water passage 8 and the lower portion of the hot water tank 2 are connected to each other, and a discharge port thereof is located on a connection portion side where the hot water passage 8 and the upper portion of the hot water tank 2 are connected to each other. With this configuration, when the hot water supplier 9 operates, the low-temperature hot water in the lower portion of the hot water tank 2 flows out from the lower portion of the hot water tank 2 and flows into the heat exchanger 7. Then, the hot water heated by the heat exchange with the cooling water in the heat exchanger 7 returns to the upper portion of the hot water tank 2. Thus, the high-temperature hot water is stored in the upper portion of the hot water tank 2. With this configuration, the high-temperature hot water heated in the heat exchanger 7 is sequentially stored from an upper layer to lower layer in the hot water tank 2. Therefore, as compared to a case where the entire hot water is boiled up at once, the hot water required by the heat load can be stored in the upper portion of the hot water tank 2 in a short period of time and be supplied to the heat load.

Mainly used as the cooling water supplier 6 is a centrifugal pump, a mixed flow pump, a reciprocating pump, or the like. Mainly used as the heat exchanger 7 is a plate heat exchanger, a double-pipe heat exchanger, or the like. Mainly used as the hot water supplier 9 is a centrifugal pump, a mixed flow pump, a reciprocating pump, or the like.

The mixing valve 14 is disposed at a portion where a tail end of the second water supplying passage 13 is connected to a portion of the hot water supplying passage 11. The mixing valve 14 mixes the hot water flowing through the hot water supplying passage 11 with water flowing from the second water supplying passage 13. Mainly used as the mixing valve 14 is a drum valve, a ball valve, or the like. The flow rate detector 17 is one example of a heat demand detector of the present invention and is mainly constituted by a flow meter, a flow switch, or the like capable of measuring a flow rate.

In the present invention, the electric power consuming heater is a device configured to consume input electric power to discharge heat, the amount of which corresponds to the electric power consumption, thereby heating an object to be heated. Typical examples are an electric heater configured to convert the input electric power into Joule heat to heat the object to be heated and a heat pump configured to convert the input electric power into a motive power to cause the heat medium to circulate by the motive power, thereby causing the heat to move. Each of the electric heater and the heat pump discharges heat, the amount of which corresponds to the electric power consumption. In contrast, a device (such as a gas heater) configured to heat the object to be heated using the heat derived from a heat source other than electricity and consume the electric power simply by a controller does not discharge heat, the amount of which corresponds to the electric power consumption. Therefore, such device is not one example of the electric power consuming heater. Since the power consumption (rated output) of the heater 12 needs to absorb the surplus electric power, it needs to be at least larger than the rated output of the fuel cell 1. Further, since the heater 12 serves as a backup heat source, the power consumption of the heater 12 needs to be an enough output as the backup heat source. In the present embodiment, for example, the rated output of the fuel cell 1 is 1 kw, and the power consumption of the heater 12 is 3 kw.

The controller 19 is constituted by a microcomputer for example and includes a calculating portion constituted by a CPU and a storage portion constituted by an internal memory. The controller 19 controls such that the calculating portion loads and executes a control program stored (saved) in the storage portion. In the present invention, the controller denotes not only a single controller but also a group of a plurality of controllers. Therefore, the controller 19 does not have to be constituted by a single controller but may be constituted by a plurality of controllers which are dispersively arranged and carries out control operations in cooperation with one another.

The controller 19 receives detection outputs from required components, such as the flow rate detector 17, the temperature detector 8, and a below-described current detector 40 in the cogeneration system (see FIG. 2). The controller 19 controls operations of various components, such as the cooling water supplier 6, the hot water supplier 9, the heater 12, the mixing valve 14, and the bypass valve 16 in the cogeneration system based on the detection outputs.

Next, the configuration of an electric system of the cogeneration system of the present embodiment will be explained.

Figure 2:
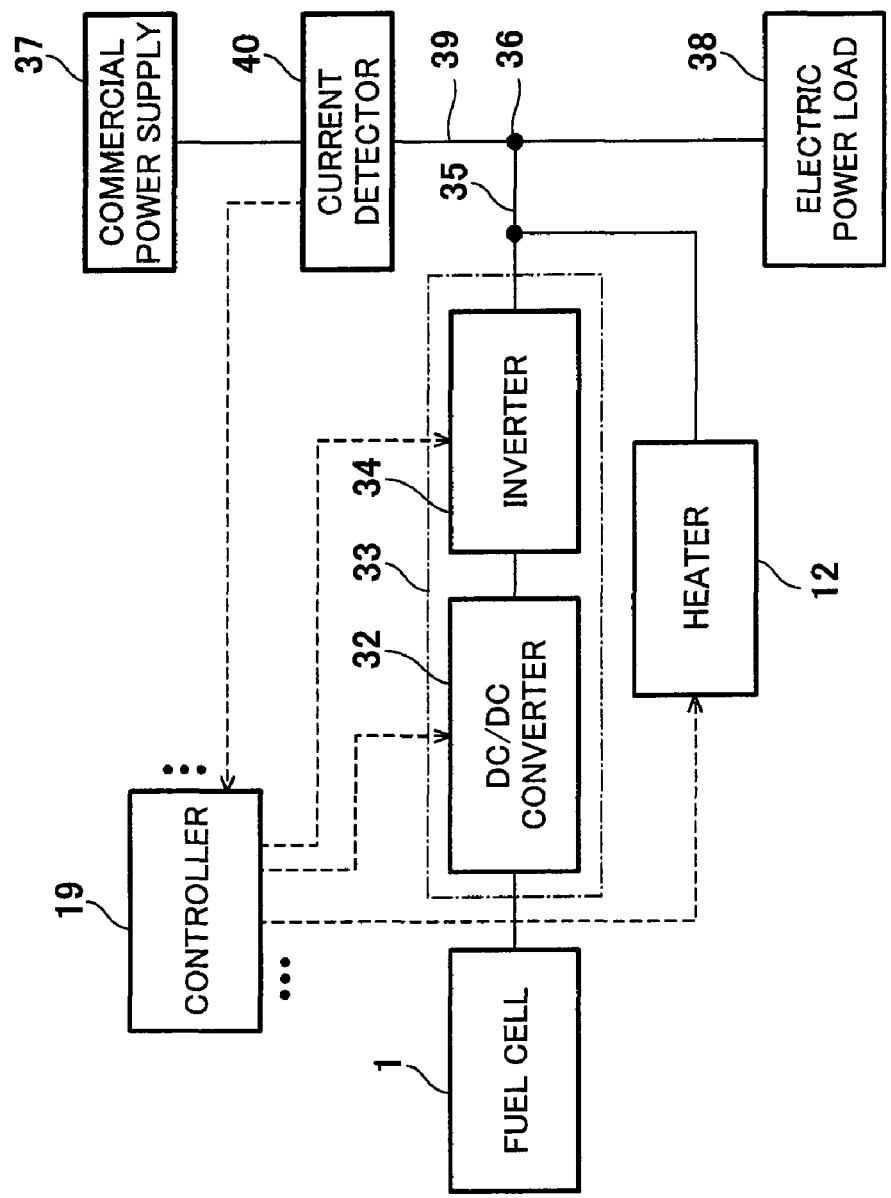
FIG. 2 is a simplified block diagram showing the configuration of an electric system of the cogeneration system of FIG. 1.

FIG. 2 is a simplified block diagram showing the configuration of the electric system of the cogeneration system of FIG. 1.

As shown in FIG. 2, DC power generated by the fuel cell 1 is output to a DC/DC converter 33. The DC/DC converter 33 boosts the DC power to a predetermined voltage to output it to an inverter 34. An output side of the inverter 34 is connected to an electric wire 39 via an electric wire 35 at an interconnection point 36. The electric wire 39 connects a commercial power supply 37 and an electric power load (for example, domestic electrical equipment). The inverter 34 converts the input DC power into AC power to output the AC power to the electric power load while interconnecting the commercial power supply 37. In addition, the inverter 34 controls its output (output current) to control the amount of electric power generated by the fuel cell 1. The DC/DC converter 33 and the inverter 34 constitute an output controller 32, and operations of the DC/DC converter 33 and the inverter 34 are controlled by the controller 19. The current detector 40 configured to detect the direction and magnitude of the current flowing through the electric wire 39 extending between the commercial power supply 37 and the interconnection point 36 is disposed on the electric wire 39 extending between the commercial power supply 37 and the interconnection point 36. The detection output of the current detector 40 is input to the controller 19. Further, the heater 12 is connected to the output side of the inverter 34.

Next, operations of the cogeneration system of the present embodiment having the above-described configuration will be explained.

First, general operations will be simply explained.

Referring to FIGS. 1 and 2, the fuel cell 1 generates electric power by an electrochemical reaction between the fuel gas, such as hydrogen, supplied through the fuel gas passage 3 and the oxidizing gas, such as oxygen, supplied through the oxidizing gas passage 4. Mainly used as the fuel cell 1 is a polymer electrolyte fuel cell, a phosphoric-acid fuel cell, a molten carbonate fuel cell, or the like. The electric power generated by the fuel cell 1 is converted from the DC power into the AC power by the output controller 32 to be supplied to the electric power load 38. The electric power load 38 is also connected to the normal commercial power supply 37. Therefore, in a case where the electric power load 38 requires the electric power larger than the electric power generated by the fuel cell 1, the electric power load 38 is supplied with lacking electric power from the commercial power supply 37. In view of the energy of the cogeneration system, it is wasteful and not desirable that in a case where the electric power required by the electric power load 38 is smaller than the electric power generated by the fuel cell 1, remaining electric power (surplus electric power) is caused to flow back to (reverse power flow) the commercial power supply 37. Therefore, as will be described later, the heater 12 is operated by the surplus electric power, and the heat discharged at this time is recovered, thereby suppressing an energy loss.

Next, an operation of recovering exhaust heat from the fuel cell 1 using the heat exchanger 7 will be explained. The cooling water having recovered the exhaust heat from the fuel cell 1 to increase in temperature releases heat in the heat exchanger 7 by the heat exchange with the hot water and is again supplied to the fuel cell 1 by the cooling water supplier 6. In contrast, the hot water is supplied from the lower portion of the hot water tank 2, is heated in the heat exchanger 7 by the heat exchange with the cooling water, and returns to the upper portion of the hot water tank 2. The high-temperature hot water having returned to the hot water tank 2 is sequentially stored from the upper layer to lower layer in the hot water tank 2. To control the temperature of the hot water stored in the hot water tank 2, the controller 19 controls an output of the hot water supplier 9 based on a temperature detected by the temperature detector 18. For example, the output of the hot water supplier 9 is controlled such that the detected temperature becomes a predetermined threshold (for example, 60° C.) or higher. At this time, unlike conventional cogeneration systems, a surplus electric power heater is not disposed on the hot water passage 8 in the cogeneration system of the present embodiment. Therefore, in the output control of the hot water supplier 9, it is unnecessary to deal with the change in the amount of heat generated by the surplus electric power heater due to the change in the amount of surplus electric power. As a result, the controllability of the hot water supplier 9 for the temperature control of the hot water stored in the hot water tank 2 improves.

Next, an operation of recovering the exhaust heat when the heater 12 is operated by the surplus electric power will be explained.

Figure 3:
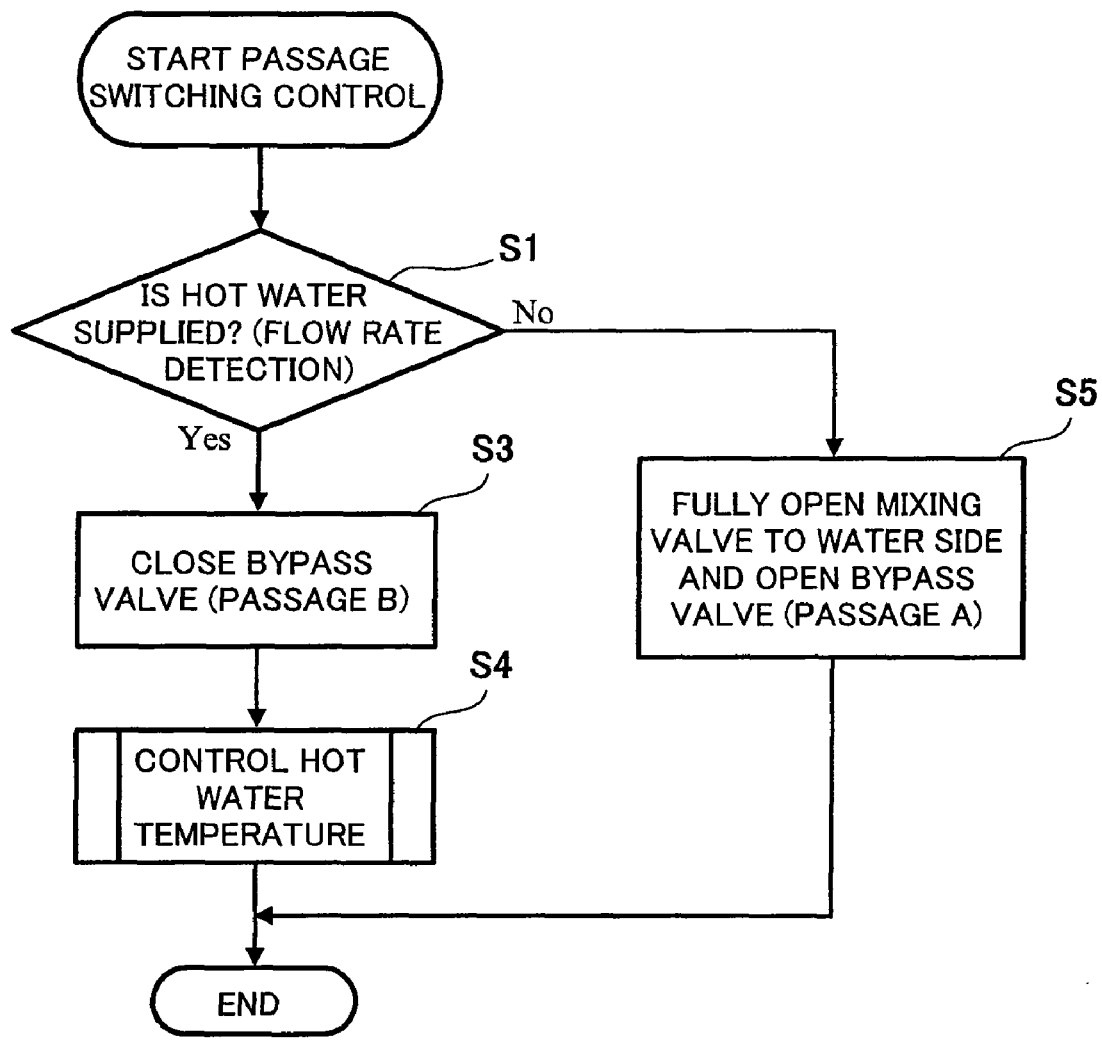
FIG. 3 is a flow chart showing steps of passage switching control of a hot water supplying passage in the cogeneration system of FIG. 1.
Figure 4:
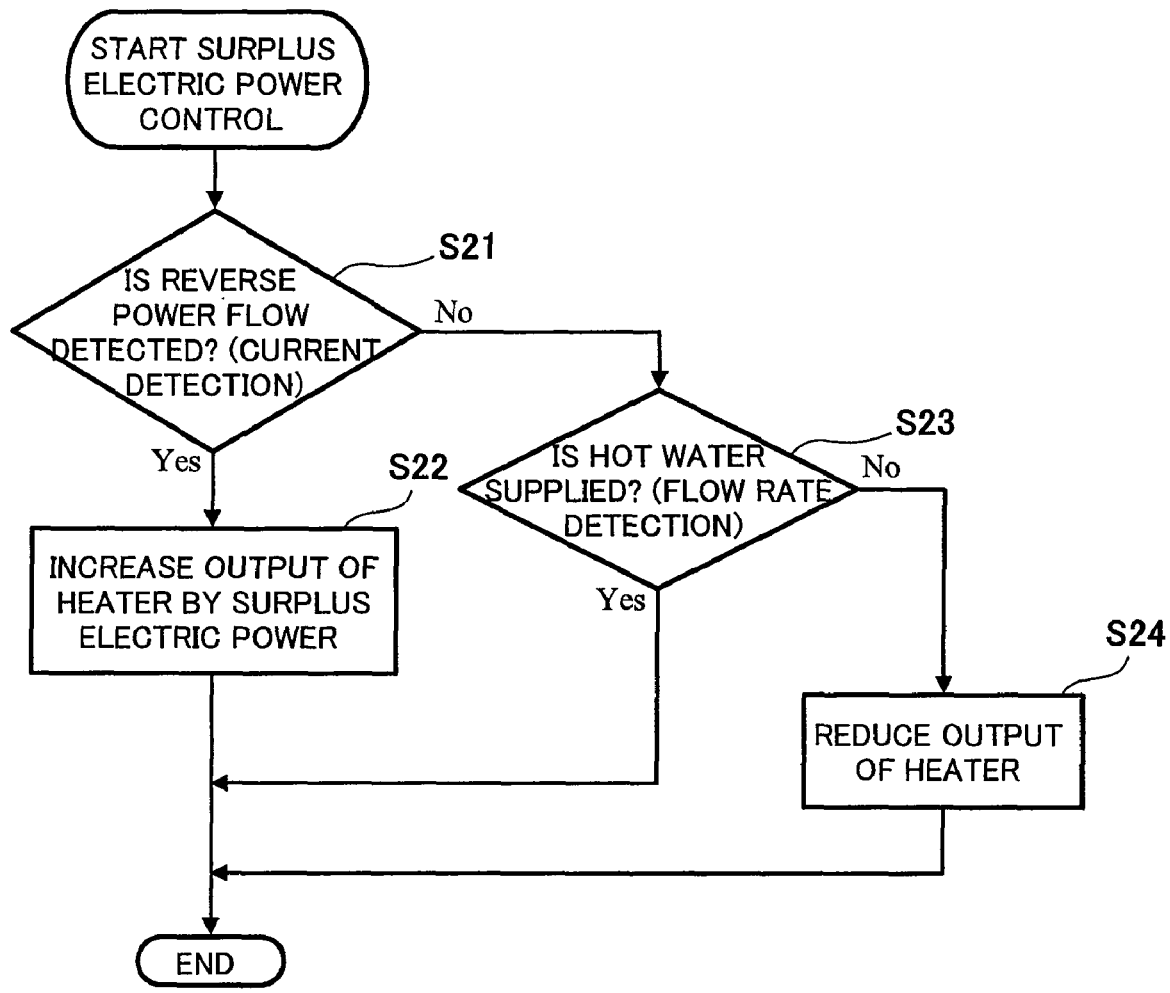
FIG. 4 is a flow chart showing steps of surplus electric power control in the cogeneration system of FIG. 1.
Figure 5:
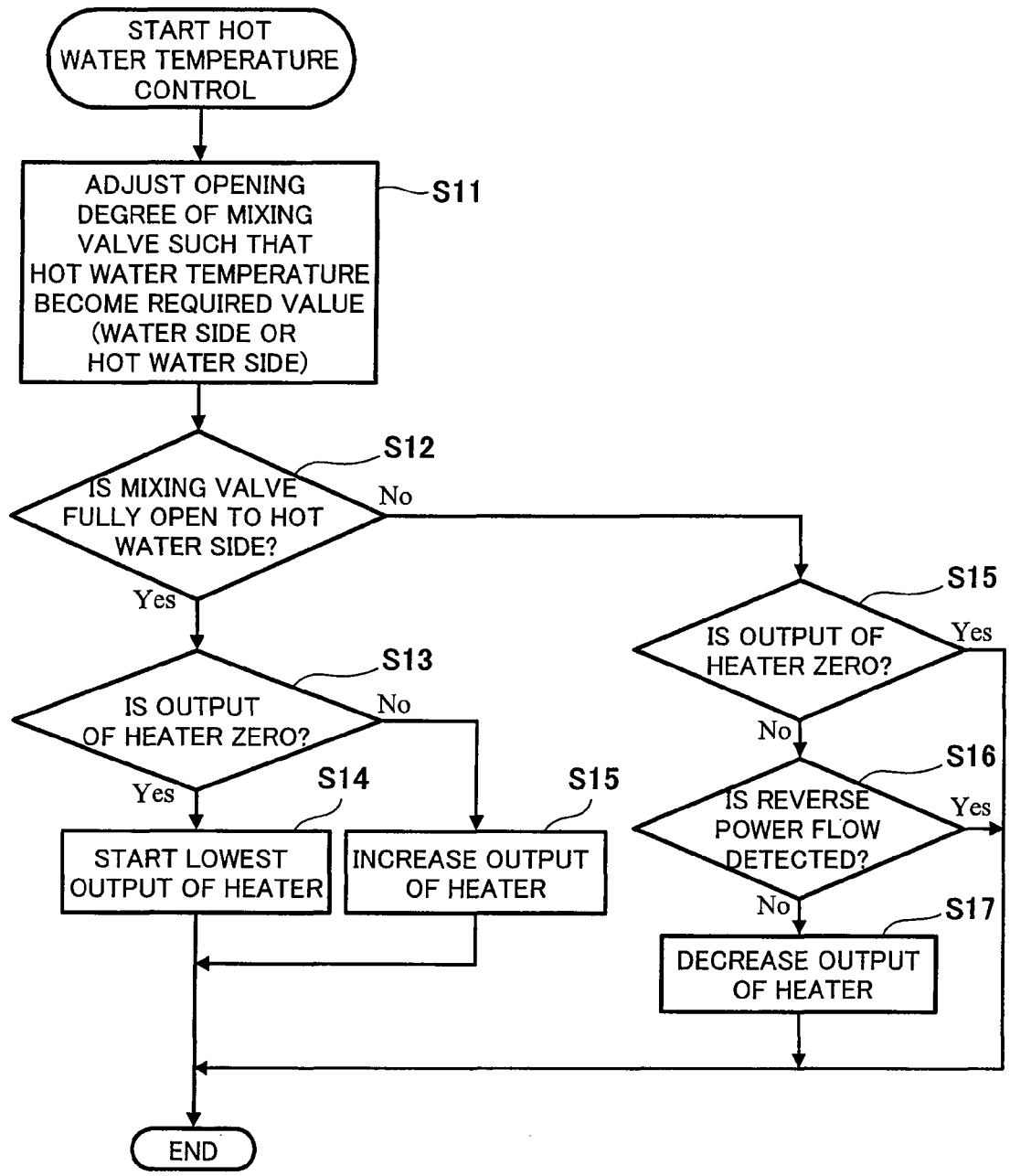
FIG. 5 is a flow chart showing steps of temperature control of hot water in the cogeneration system of FIG. 1.
Figure 6:
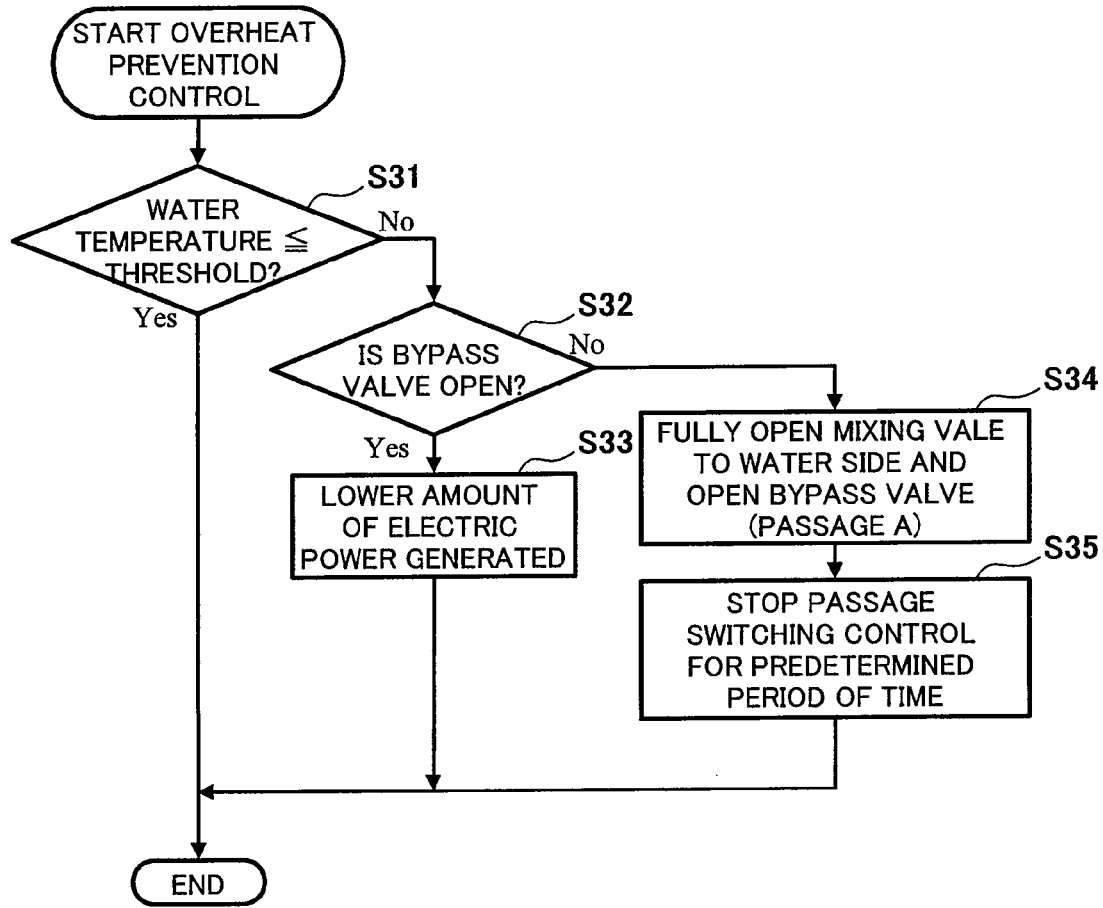
FIG. 6 is a flow chart showing steps of overheat prevention control of a heater in the cogeneration system of FIG. 1.

FIG. 3 is a flow chart showing steps of passage switching control of the hot water supplying passage in the cogeneration system of FIG. 1. FIG. 4 is a flow chart showing steps of surplus electric power control in the cogeneration system of FIG. 1. FIG. 5 is a flow chart showing steps of temperature control of the hot water in the cogeneration system of FIG. 1. FIG. 6 is a flow chart showing steps of overheat prevention control of the heater in the cogeneration system of FIG. 1.

In the control of the operation of the cogeneration system in the present embodiment, the passage switching control of the hot water supplying passage, the temperature control of the hot water, the surplus electric power control, and the overheat prevention control of the heater are carried out. These control are carried out such that the calculating portion of the controller 19 loads and executes respective control programs stored in the storage portion of the controller 19.

The controller 19 always carries out the passage switching control, the surplus electric power control, and the overheat prevention control at predetermined intervals (sampling intervals). In an initial setting (default), the bypass valve 16 is open, the mixing valve 14 is open to the second water supplying passage 13 side, and the heater 12 is in a stop state. Moreover, regarding an opening degree (valve body position) of the mixing valve 14, a state where the mixing valve 14 is fully open to "the second water supplying passage 13 side" is expressed as "fully open to the water side", and a state where the mixing valve 14 is fully open to "the hot water supplying passage 11 side" is expressed as "fully open to the hot water side".

First, the passage switching control will be explained.

As shown in FIG. 3, the controller 19 determines whether or not the hot water is supplied (whether or not there is the heat demand of the heat load) (Step S1). Specifically, in a case where the flow rate detector 17 detects the flow of the hot water, the controller 19 determines that the hot water is supplied (Yes in Step S1). In a case where the flow rate detector 17 does not detect the flow of the hot water, the controller 19 determines that the hot water is not supplied (No in Step S1). In a case where the controller 19 determines that the hot water is not supplied, the controller 19 causes the bypass valve 16 to open and causes the mixing valve 14 to fully open to the water side (Step S5). With this, the second heat medium passage A is formed. Then, a portion of the hot water supplying passage 11 which portion extends between the hot water tank 2 and the mixing valve 14 switches to a part of the second heat medium passage A. Then, the present control is terminated.

In contrast, in a case where the controller 19 determines that the hot water is supplied, the controller 19 causes the bypass valve 16 to close (Step S3). With this, the heat supplying passage B is formed. Then, the portion of the hot water supplying passage 11 which portion extends between the hot water tank 2 and the mixing valve 14 switches to a part of the heat supplying passage B. Then, the controller 19 carries out hot water temperature control (Step S4). The hot water temperature control will be described later in detail. Then, the present control is terminated.

By repeatedly carrying out the present control at predetermined intervals, the controller 19 monitors whether or not the hot water is supplied, and the heat supplying passage B and the second heat medium passage A are formed so as to switch depending on whether or not the hot water is supplied.

Next, the surplus electric power control will be explained.

The surplus electric power of the fuel cell 1 is detected by the current detector 40 disposed on the commercial power supply 37 side of the interconnection point 36 where the fuel cell 1 and the commercial power supply 37 are connected to each other. As shown in FIG. 4, in the surplus electric power control, the controller 19 first determines whether or not the surplus electric power is generated (Step S21). Specifically, in a case where the current detector 40 detects a current flowing toward the commercial power supply 37, the controller 19 determines that the surplus electric power is generated. In a case where the current detector 40 does not detect the current flowing toward the commercial power supply 37, the controller 19 determines that the surplus electric power is not generated. In a case where the controller 19 determines that the surplus electric power is generated, the controller 19 calculates the surplus electric power based on the current detected by the current detector 40 and increases the output of the heater 12 in accordance with the surplus electric power (Step S22). Then, the present control is terminated. In contrast, in a case where the controller 19 determines that the surplus electric power is not generated, the controller 19 determines whether or not the hot water is supplied (Step S23). In a case where the hot water is not supplied, the output of the heater 12 is reduced, and a series of steps of the present control are then terminated. After that, the present control is repeated at predetermined intervals (sampling intervals). With this, in a case where the hot water is not supplied, the output of the heater 12 is reduced until a state where the heater 12 does not consume the electric power (commercial electric power for example) other than the surplus electric power is realized. In contrast, in a case where the hot water is supplied (Yes in Step S23), a series of steps of the present control are terminated. This is because in a case where the hot water is supplied, the controller 19 controls the output of the heater 12 as a part of the hot water temperature control.

By repeatedly carrying out a series of steps of the present control shown in FIG. 4, the heater 12 consumes the surplus electric power, and this prevents the reverse power flow of the surplus electric power. In addition, in a case where the reverse power flow is not detected and the hot water is not supplied by repeatedly carrying out a series of steps of the present control, Step S24 is executed until the reverse power flow is detected. To be specific, the output of the heater 12 is reduced and the extra consumption of the commercial electric power by the electric power load is reduced until a state is resolved, in which the heater 12 consumes the electric power larger than the surplus electric power actually remaining with respect to the electric power demand of the electric power load in the output electric power of the fuel cell 1, and the electric power load utilizes the commercial electric power. In the present control, as described above, the second heat medium passage A and the heat supplying passage B are formed so as to switch depending on whether or not the hot water is supplied. In a case where the second heat medium passage A is formed, the hot water flows through the second heat medium passage A (the first water supplying passage 10, the second water supplying passage 13, the bypass passage 15, and the hot water supplying passage 11) in a direction from a lower side to an upper side as shown in FIG. 1, heated by the heater 12, and then stored in the upper portion of the hot water tank 2. This flow of the water is caused by a draft effect generated by the temperature difference between the water not yet heated by the heater 12 and the water heated by the heater 12. With this, the surplus electric power is converted into the heat to be stored in the hot water tank 2.

In contrast, in a case where the heat supplying passage B is formed, the consumption of the surplus electric power by the heater 12 is controlled as a part of the hot water temperature control.

Next, the hot water temperature control will be explained in detail.

In FIG. 1, in a case where a heat load side valve is open, as described above, the flow rate detector 17 detects the flow of the hot water, and the heat supplying passage B is formed by the control of the controller 19. Then, as shown in FIG. 1, the hot water flows from the upper portion of the hot water tank 2 in a direction from an upper side to a lower side. Simultaneously, the water, the amount of which corresponds to the amount of hot water having flowed out from the upper portion of the hot water tank 2, is supplied through the first water supplying passage 10 to the lower portion of the hot water tank 2.

In this state, the controller 19 adjusts the opening degree (valve body position) of the mixing valve 14 such that the hot water temperature (temperature of the hot water flowing through a portion of the hot water supplying passage 11 which portion is located downstream of the mixing valve 14) becomes a required value (Step S11). Specifically, a temperature detector (not shown) is disposed on the portion of the hot water supplying passage 11 which portion is located downstream of the mixing valve 14, and the controller 19 detects the hot water temperature by this temperature detector. In addition, an adjuster (remote controller (not shown) for example) configured to adjust the hot water temperature is included on the heat load side. In a case where a user operates the adjuster to adjust the hot water temperature, an adjusted value (required hot water temperature: hereinafter referred to as "required value") is input to the controller 19. The controller 19 adjusts the opening degree of the mixing valve 14 such that the hot water temperature detected by the temperature detector becomes the required value. In this case, as the opening degree of the mixing valve 14 to the water side increases, the amount of water supplied through the second water supplying passage 13 and mixed with the hot water flowing through the hot water supplying passage 11 increases, and this lowers the hot water temperature. In contrast, as the opening degree of the mixing valve 14 to the hot water side increases, the amount of water supplied through the second water supplying passage 13 and mixed with the hot water flowing through the hot water supplying passage 11 decreases, and this increases the hot water temperature.

Next, the controller 19 determines whether or not the opening degree of the mixing valve 14 to the hot water side is a fully open state (Step S12).

In a case where the opening degree of the mixing valve 14 to the hot water side is the fully open state (Yes in Step S12), the controller 19 determines whether or not the output of the heater 12 is zero (Step S13). In a case where the output of the heater 12 is zero (Yes in Step S13), the output of the heater 12 starts (Step S14). After that, a series of steps of the present control are terminated. In a case where the output of the heater 12 is not zero (No in Step S13), the output of the heater 12 increases (Step S15). Here, the case where the output of the heater 12 is not zero includes both a case where the heater 12 is started up in Step S14 and a case where the heater 12 is started up by the generation of the surplus electric power in the above-described surplus electric power control (Step S22). After that, a series of steps of the present control are terminated.

In contrast, in a case where the opening degree of the mixing valve 14 to the hot water side is not the fully open state (No in Step S12), the controller 19 determines whether or not the output of the heater 12 is zero (Step S15). In a case where the output of the heater 12 is zero (Yes in Step S15), a series of steps of the present control are terminated. This is because in this case, since the hot water is mixed with the water, the temperature of the hot water supplied from the hot water tank 2 is higher than the required value, so that the hot water does not have to be heated by the heater 12. In a case where the output of the heater 12 is not zero (No in Step S15), the controller 19 determines whether or not the reverse power flow is detected (Step S16). As described above, the case where the output of the heater 12 is not zero includes both the case where the heater 12 is started up in Step S14 and the case where the heater 12 is started up by the generation of the surplus electric power in the surplus electric power control (Step S22). Then, in a case where the reverse power flow is detected (Yes in Step S16), a series of steps of the present control are terminated. In a case where the reverse power flow is not detected (No in Step S16), the output of the heater 12 is reduced, and a series of steps of the present control are then terminated. In a case where the reverse power flow is detected, the output of the heater is controlled to be increased in Step S22 shown in FIG. 4 as a part of the surplus electric power control.

By repeatedly carrying out a series of steps of the present control shown in FIG. 5 as above, the hot water temperature is controlled to be a user's requested value by adjusting the opening degree of the mixing valve 14 in a case where the adjustment of the opening degree of the mixing valve 14 can deal with the temperature control. In a case where the surplus electric power is generated in this process or has already been generated, the heater 12 heats the hot water, supplied to the heat load, by the output corresponding to the surplus electric power that is the actually remaining electric power with respect to the electric power demand of the electric power load, and the heated hot water is mixed with the water to be supplied to the heat load. With this, the surplus electric power is effectively utilized. In addition, it is possible to prevent the energy efficiency from deteriorating by wastefully consuming the commercial electric power.

In contrast, the reason why Step S14 or S15 is executed in a case where the mixing valve 14 is fully open to the hot water side is because since the temperature of the hot water supplied from the hot water tank 2 is equal to or lower than the required value in the case where the opening degree of the mixing valve 14 to the hot water side is the fully open state, the execution of Step S14 or S15 causes the temperature of the hot water flowing though a portion of the hot water supplying passage 11 which portion is located upstream of the mixing valve 14 to be at least the required value or higher. In addition, Steps S14 and 15 are executed regardless of whether or not the surplus electric power is generated, and the heater 12 serves as a backup heat source. Specifically, not only the surplus electric power of the fuel cell 1 but also the commercial electric power supplied from the commercial power supply 37 are utilized as the electric power necessary for increasing the temperature of the hot water, supplied from the hot water tank 2, to be the required value or higher. For example, in a case where the surplus electric power is generated in Step S14 or S15 or has already been generated, the amount of electric power supplied from the commercial power supply 37 is reduced in accordance with the amount of the surplus electric power. With this, the surplus electric power is effectively utilized.

Next, the overheat prevention control will be explained.

As shown in FIG. 6, when the overheat prevention control is started, the controller 19 first determines whether or not the temperature of the heater 12 is equal to or lower than the predetermined threshold (Step S31). Specifically, a temperature detector (not shown) configured to detect the temperature of the water in the hot water supplying passage 11 on which the heater 12 is disposed is provided, and the controller 19 causes the temperature detector to detect the temperature of the water flowing through the hot water supplying passage 11 and heated by the heater 19. Moreover, the storage portion of the controller 19 stores the predetermined threshold. The controller 19 determines whether or not the temperature of the water heated by the heater 12 which temperature is detected by the temperature detector is equal to or lower than the predetermined threshold stored in the storage portion.

Then, in a case where the temperature of the water heated by the heater 12 is equal to or lower than the predetermined threshold (Yes in Step S31), the water heated by the heater 12 does not become an overheated state. Therefore, a series of steps of the present control are terminated. In contrast, in a case where the temperature of the water heated by the heater 12 exceeds the predetermined threshold (No in Step S31), the water heated by the heater 12 may become the overheated state. In this case, the controller 19 first determines whether or not the bypass valve 16 is open (Step S32). In a case where the bypass valve 16 is open (Yes in Step S32), the controller 19 lowers the amount of electric power generated by the fuel cell 1 (Step S33). With this, by reducing the surplus electric power supplied to the heater 12 and repeatedly executing a series of steps of the present control, the temperature of the water heated by the heater 12 becomes equal to or lower than the predetermined threshold, and the amount of electric power generated by the fuel cell 1 is reduced until a risk of the occurrence of the overheat disappears. In contrast, in a case where the bypass valve 16 is not open (No in Step S32), the controller 19 causes the mixing valve 14 to fully open to the water side and the bypass valve 16 to open (Step S34). Then, the passage switching control is stopped for a predetermined period of time (Step S35). After that, a series of steps of the present control are terminated. Here, the heat supplying passage B is first formed. However, since the amount of water supplied to the heat load is limited by the opening degree of the heat load side valve, there is a case where the temperature of the hot water supplied to the heat load cannot be reduced from the overheated state to the required value by the adjustment of the ratio of the mixed water. In this case, by fully opening the mixing valve 14 to the water side in Step S34, the water is supplied through the first water supplying passage 10 to the heat load, and this prevents the overheated hot water from being supplied to the heat load. In addition, by opening the bypass valve 16, the second heat medium passage A is formed, and the water is supplied through the first water supplying passage 10 to the heater 12. As a result, the temperature of the water flowing into the hot water supplying passage 11 on which the heater 12 is disposed lowers as compared to a case where the hot water flowing from the hot water tank 2 into the hot water supplying passage 11 on which the heater 12 is disposed is the heated water in a state where the heat supplying passage B is formed. Therefore, the temperature of the water heated by the heater 12 can also be decreased from an almost overheated state. Then, this state is maintained for a predetermined period of time by stopping the passage switching control for a predetermined period of time.

Thus, the overheat of the heater 12 and failures caused by the overheat can be prevented.

As explained above, in accordance with the present embodiment, the heater 12 is disposed on the hot water supplying passage 11 and the second heat medium passage A so as to be able to heat the hot water or the water flowing through the hot water supplying passage 11 and the second heat medium passage A, and the heater 12 is configured to perform heating by consuming the surplus electric power in a case where the surplus electric power is generated and by consuming the electric power supplied from at least one of the fuel cell 1 and the commercial power supply 37 in a case where the surplus electric power is not generated. With this, the surplus electric power can be recovered as the heat, released from the heater 12, to suppress the energy loss. In addition, it becomes unnecessary to additionally dispose an auxiliary heat source on the hot water supplying passage of a conventional cogeneration system. This realizes reductions in cost and size of the cogeneration system.

Embodiment 2

Figure 7:
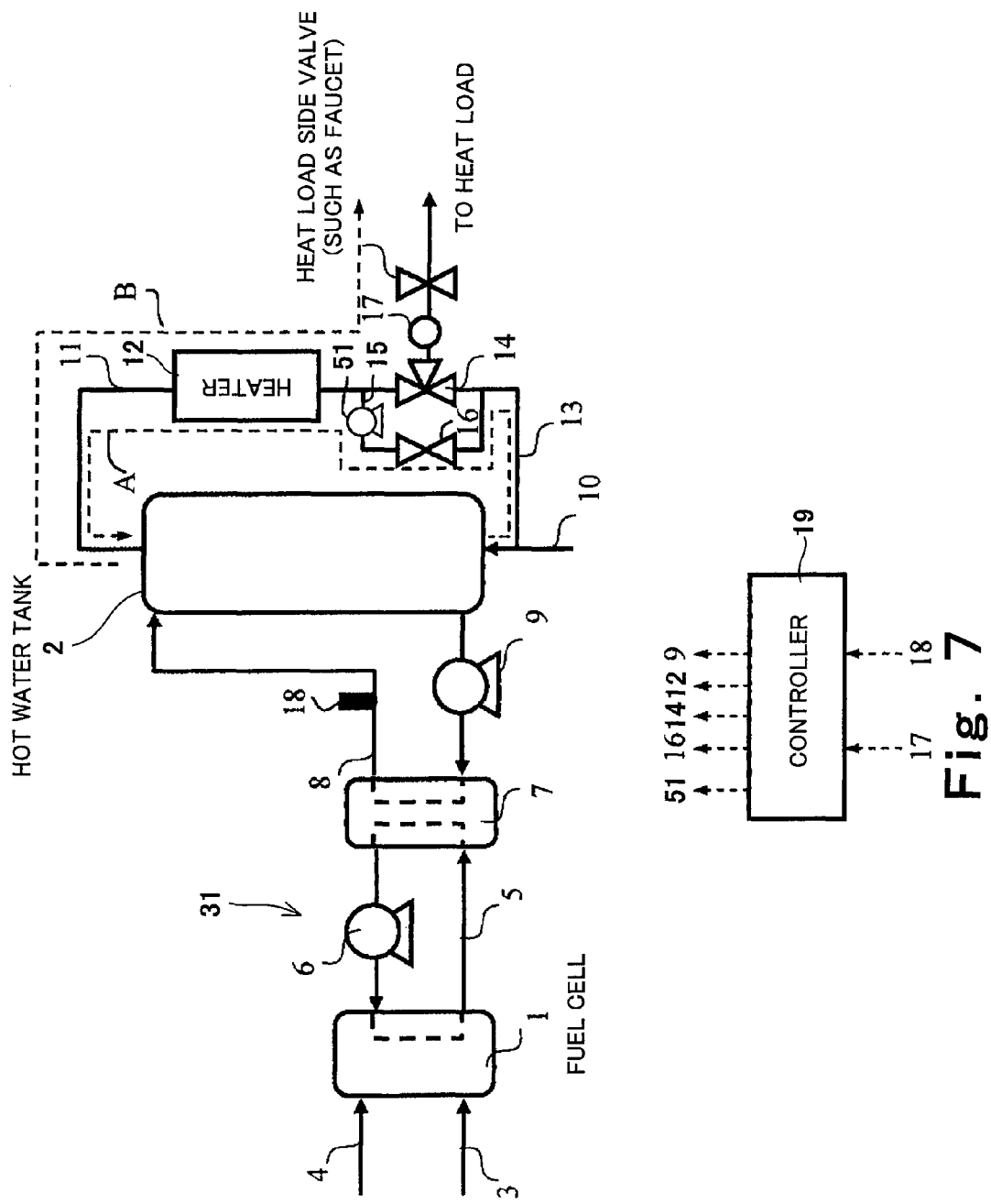
FIG. 7 is a system configuration diagram showing the cogeneration system according to Embodiment 2 of the present invention.
Figure 8:
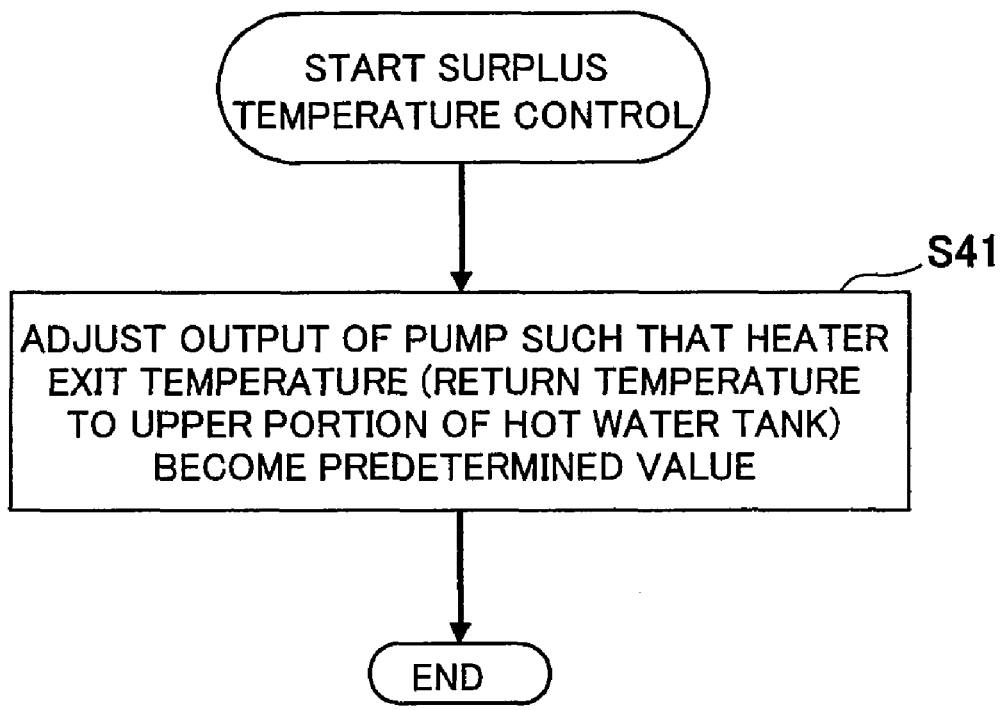
FIG. 8 is a flow chart showing steps of temperature control of the hot water in a second heat medium passage in the cogeneration system of FIG. 7.

FIG. 7 is a system configuration diagram showing the cogeneration system according to Embodiment 2 of the present invention. FIG. 8 is a flow chart showing steps of the temperature control of the hot water in the second heat medium passage A in the cogeneration system of FIG. 7.

As shown in FIG. 7, in the present embodiment, a hot water supplier 51 is disposed on the second heat medium passage A. In addition, a temperature detector, not shown, is disposed on a portion of the hot water supplying passage 11 which portion extends between the heater 12 and the hot water tank 2, and the controller 19 uses the temperature detector to detect the temperature (hereinafter referred to as "heater exit temperature") of the hot water having flowed out from the heater 12 in a case where the second heat medium passage A is formed. Other than this, Embodiment 2 is the same as Embodiment 1. The hot water supplier 51 may be disposed anywhere on the second heat medium passage A. Herein, the hot water supplier 51 is disposed on the bypass passage 15. The controller 19 causes the hot water supplier 51 to start up when the second heat medium passage A is formed and stop when the heat supplying passage B is formed. As shown in FIG. 8, in a case where the second heat medium passage A is formed, the controller 19 controls the output of the hot water supplier 51 such that the heater exit temperature of the hot water flowing through the second heat medium passage A becomes equal to or more than a predetermined value. This predetermined value is a value predetermined as a temperature threshold of the hot water heated by the heat exchanger 7 or the heater 12 and stored from the upper portion of the hot water tank 2. With this, return temperature to the upper portion of the hot water tank 2 is appropriately controlled, and the stack structure of the hot water in the hot water tank 2 is appropriately maintained. Note that the control of the hot water supplier 51 in the present embodiment may be applied to Step S33 in which the amount of electric power generated by the fuel cell 1 is lowered in the overheat control in Embodiment 1. Specifically, in a case where the temperature of the water heated by the heater 12 exceeds the predetermined threshold instead of the heater exit temperature (No in Step S31), and the bypass valve is open (Yes in Step S32), the output of the hot water supplier 51 is increased (the output of the hot water supplier is started when it is zero). Then, the output of the hot water supplier 51 is increased until the temperature of the water becomes equal to or lower than the predetermined threshold in Step S31. With this configuration, it becomes unnecessary to reduce the amount of electric power generated by the fuel cell 1 in order to avoid the overheat caused by the heater 12. Therefore, it is possible to suppress the deterioration of the energy efficiency due to the reduction in the output of the fuel cell.

Embodiment 3

Figure 9:
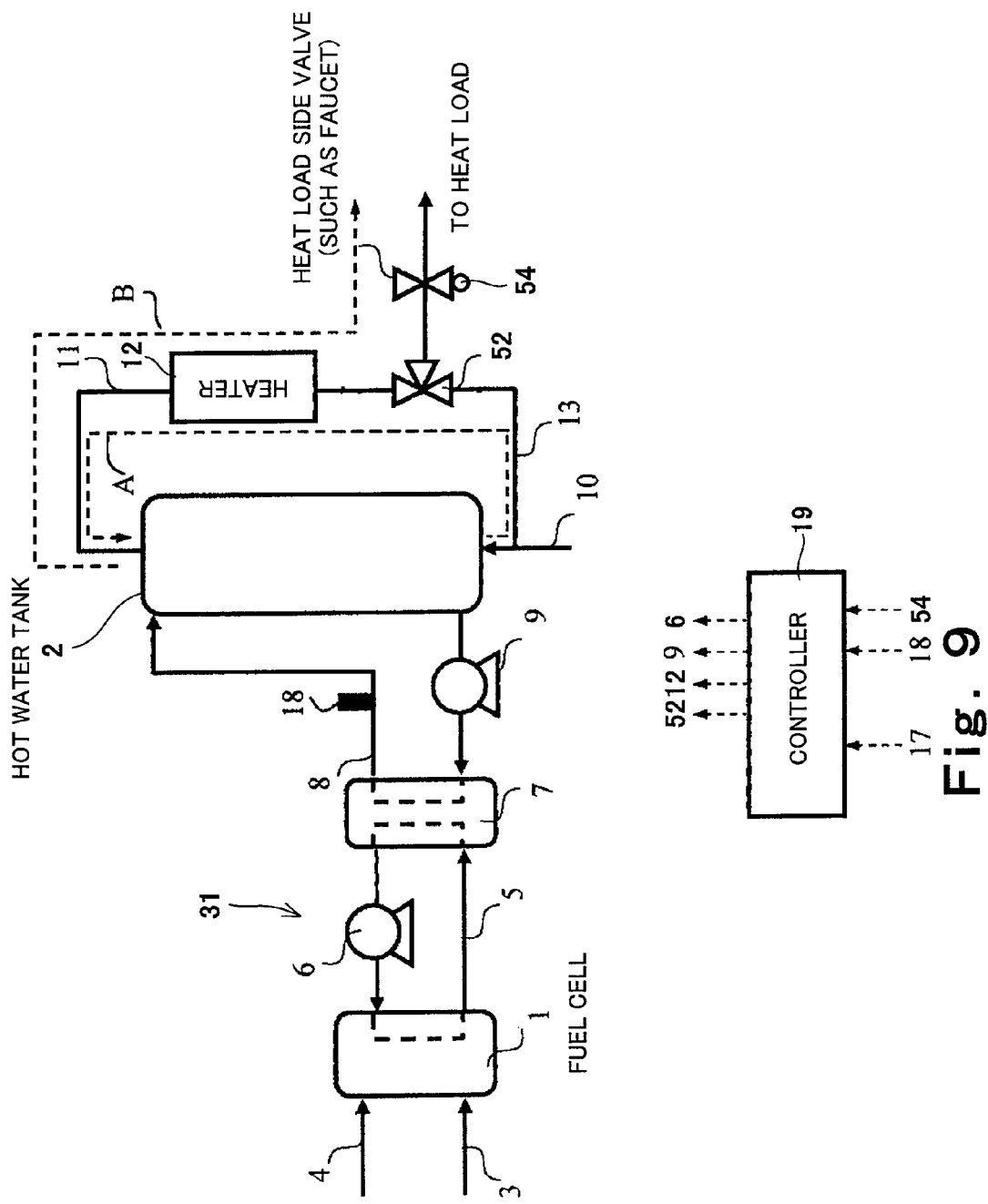
FIG. 9 is a system configuration diagram showing the cogeneration system according to Embodiment 3 of the present invention.
Figure 10:
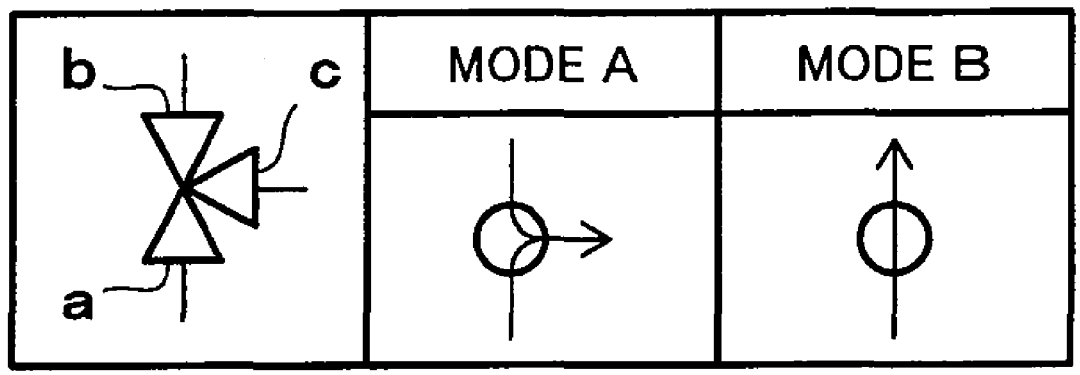
FIG. 10 is a diagram showing operating modes of a three-way valve in the cogeneration system of FIG. 9.

FIG. 9 is a system configuration diagram showing the cogeneration system according to Embodiment 3 of the present invention. FIG. 10 is a diagram showing operating modes of a three-way valve in the cogeneration system of FIG. 9.

As shown in FIG. 9, in the present embodiment, instead of the mixing valve 14 of Embodiment 1, a three-way valve 52 is disposed on a portion of the hot water supplying passage 11 so as to be connected to a tail end of the second water supplying passage 13. The bypass passage 15 of Embodiment 1 is omitted. Instead of the flow rate detector 17 of Embodiment 1, the heat load side valve is provided with an on-off sensor 54 configured to detect open and close of the heat load side valve. A detection output of the on-off sensor 54 is input to the controller 19. The on-off sensor 54 is one example of the heat demand detector of the present invention and is constituted by a limit switch, a position sensor, or the like. Other than these, Embodiment 3 is the same as Embodiment 1.

As shown in FIG. 10, the three-way valve 52 has three ports a, b, and c. The port a is connected to the tail end of the second water supplying passage 13. The port b is connected to the hot water tank 2 side of the hot water supplying passage 11. The port c is connected to the heat load side of the hot water supplying passage 11. The three-way valve 52 has two operating modes that are a mode A in which the port c is communicated with both the ports a and b and a mode B in which the port c is not communicated with the port a or b, but the port a and the port b are communicated with each other. In the mode A, the hot water tank 2 side of the hot water supplying passage 11 and the second water supplying passage 13 are connected to the heat load side of the hot water supplying passage 11. In the mode B, the hot water tank 2 side of the hot water supplying passage 11 and the second water supplying passage 13 are connected to each other, and these are not connected to the heat load side of the hot water supplying passage 11.

In a case where the controller 19 detects by the on-off sensor 54 that the heat load side valve is open, it determines that the hot water is supplied. In a case where the controller 19 detects by the on-off sensor 54 that the heat load side valve is closed, it determines that the hot water is not supplied. In a case where the hot water is supplied, the controller 19 switches the operating mode of the three-way valve 52 to the mode A. With this, the heat supplying passage B is formed. In contrast, in a case where the hot water is not supplied, the controller 19 switches the operating mode of the three-way valve 52 to the mode B. With this, the second heat medium passage A is formed. Other than these, the operations of Embodiment 3 are the same as those of Embodiment 1, so that explanations thereof are omitted.

In accordance with the present embodiment, the bypass passage 15 and the bypass valve can be omitted.

Embodiment 4

Figure 11:
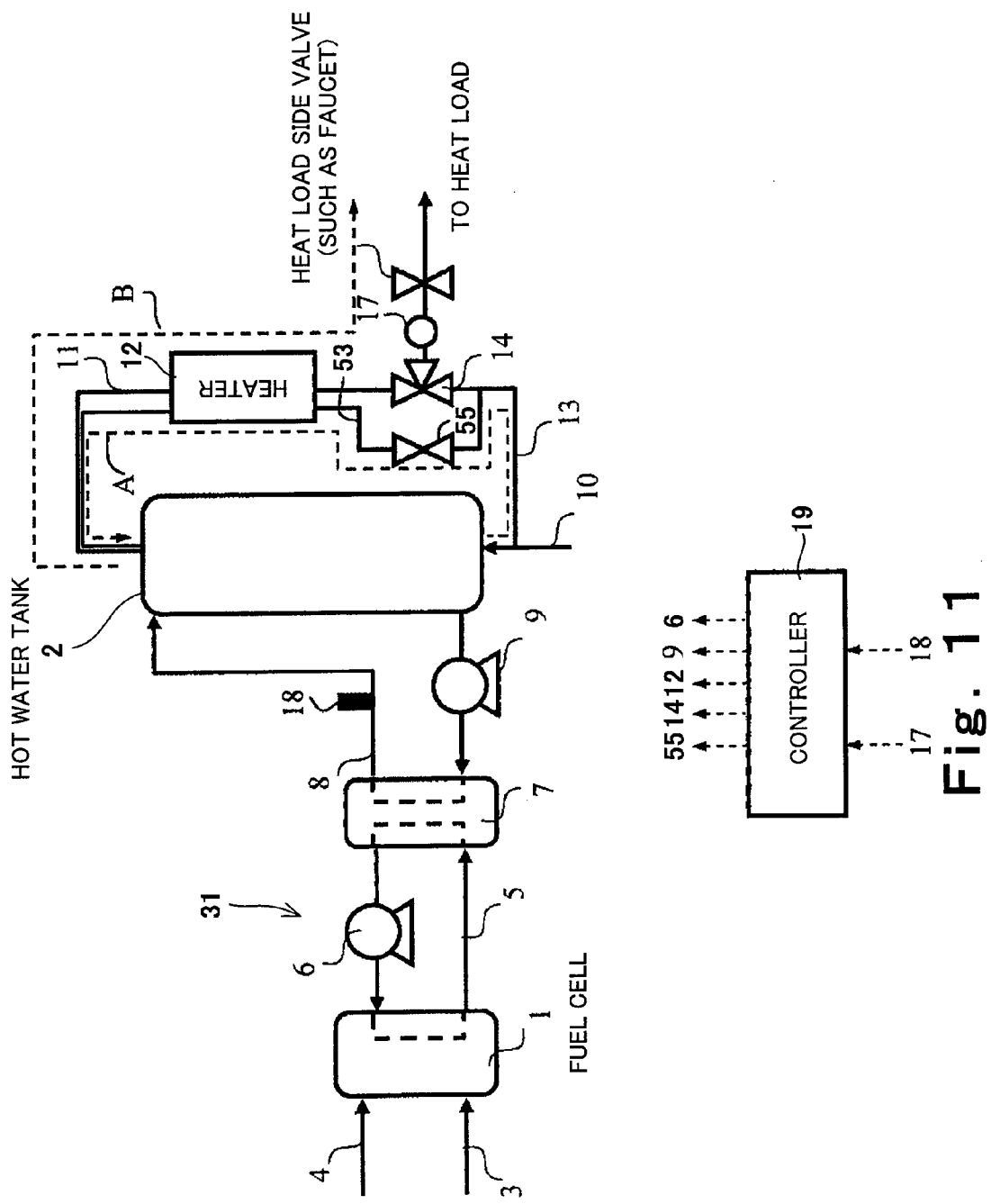
FIG. 11 is a system configuration diagram showing the cogeneration system according to Embodiment 4 of the present invention.
Figure 12:
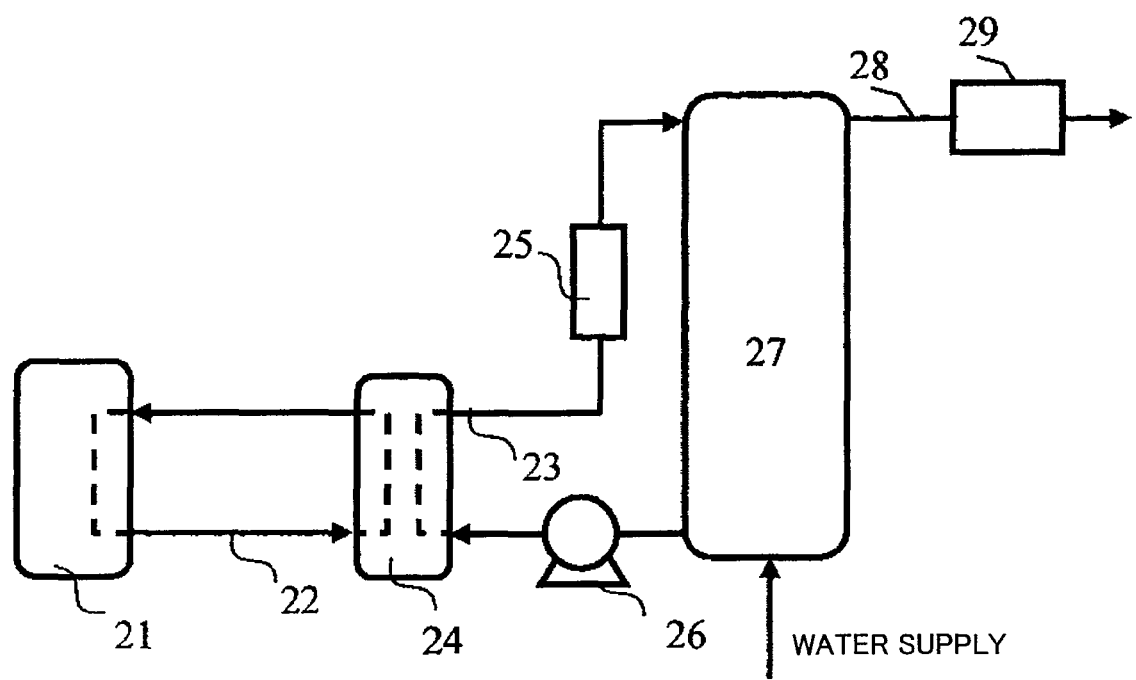
FIG. 12 is a block diagram showing a configuration example of a conventional cogeneration system.

FIG. 11 is a system configuration diagram showing the cogeneration system according to Embodiment 4 of the present invention.

As shown in FIG. 11, in the present embodiment, a third water supplying passage 53 is formed instead of the bypass passage 15 of Embodiment 1. The third water supplying passage 53 branches off from the second water supplying passage 13, and a tail end thereof is connected to the upper portion of the hot water tank 2. Then, an on-off valve 55 is disposed on the third water supplying passage 53. In addition, the heater 12 is disposed on the hot water supplying passage 11 and the third water supplying passage 53 so as to be able to heat both the hot water flowing through the hot water supplying passage 11 and the hot water flowing through the third water supplying passage 53.

In a case where the hot water is supplied, the controller 19 closes the on-off valve 55. With this, the heat supplying passage B is formed. In contrast, in a case where the hot water is not supplied, the controller 19 causes the mixing valve 14 to fully open to the water side and the on-off valve 55 to open. With this, the second heat medium passage A is formed. Other than these, the operations of Embodiment 4 are the same as those of Embodiment 1, so that explanations thereof are omitted.

The present embodiment can obtain the same effects as Embodiment 1.

In Embodiments 1 to 4, the fuel cell 1 is exemplified as the combined heat and power unit. However, the combined heat and power unit is not limited to the fuel cell and may be a device adopting a gas engine or a gas turbine.

Moreover, in Embodiments 1 to 4, the heater 12 is connected to the output side of the inverter 34. However, the heater 12 may be connected to both the output side of the inverter 34 and the input side (output side of the DC/DC converter 33) of the inverter 34 via a switching unit. In a case where the surplus electric power is generated, the electric power (DC) may be supplied from the input side (output side of the DC/DC converter 33) of the inverter 34 to the heater 12 by the switching unit. In a case where the surplus electric power is not generated, the electric power (AC) may be supplied from the output side of the inverter 34 to the heater 12 by the switching unit. With this, the loss of the surplus electric power of the fuel cell 1 by the inverter 34 is prevented, and the energy efficiency further improves.

Moreover, in Embodiments 1, 2, and 4, the flow rate detector configured to detect the flow rate of the hot water supplied to the heat load is exemplified as the heat demand detector, and in Embodiment 3, the on-off sensor of the heat load side valve is exemplified as the heat demand detector. However, the heat demand detector is not limited to these and any heat demand detector may be used as long as it can detect the heat demand.

From the foregoing explanation, many modifications and other embodiments of the present invention are obvious to one skilled in the art. Therefore, the foregoing explanation should be interpreted only as an example, and is provided for the purpose of teaching the best mode for carrying out the present invention to one skilled in the art.

The structures and/or functional details may be substantially modified within the spirit of the present invention.

Industrial Applicability

In accordance with the cogeneration system of the present invention, the controllability of the heat medium supplier improves, and lacking heat of the heat medium supplied from the heat accumulator to the heat load can be compensated using the heat of the electric power consuming heater configured to perform heating by consuming the surplus electric power and the commercial electric power without providing the additional auxiliary heat source. Therefore, the cogeneration system of the present invention is useful as a cogeneration system adopting a fuel cell or a gas turbine.

The invention claimed is:

1. A cogeneration system comprising:
   a combined heat and power unit configured to generate electricity and heat;
   a heat accumulator configured to store a heat medium having recovered the heat generated by the combined heat and power unit;
   a heat exchanger configured to transfer the heat generated by the combined heat and power unit to the heat medium;
   a first heat medium passage configured such that the heat is transferred to the heat medium by the heat exchanger and the heat medium flows into the heat accumulator;
   a heat medium supplier configured to cause the heat medium to flow through the first heat medium passage;
   a heat supplying passage through which the heat medium stored in the heat accumulator is supplied to the heat load;
   an electric power consuming heater configured to heat the heat medium flowing through the heat supplying passage toward the heat load by consuming surplus electric power of the combined heat and power unit and commercial electric power; and
   a second heat medium passage configured such that the heat medium is heated by the electric power consuming heater and flows into the heat accumulator, wherein
   the heat supplying passage through which the heat medium supplied from the heat accumulator reaches the electric power consuming heater constitutes the second heat medium passage through which the heat medium having passed through the electric power consuming heater reaches the heat accumulator.

2. The cogeneration system according to claim 1, further comprising:
   a first heat medium supplying passage through which the heat medium is supplied from a heat medium source to the heat accumulator;
   a second heat medium supplying passage configured to branch off from the first heat medium supplying passage to be connected to the heat supplying passage;
   a mixing valve disposed on a portion where the heat supplying passage and the second heat medium supplying passage are connected to each other and configured to mix the heat medium flowing through the heat supplying passage with the heat medium from the second heat medium supplying passage;
   a bypass passage configured to connect the second heat medium passage and a portion of the heat supplying passage which portion is located on the heat accumulator side of the mixing valve; and a bypass valve disposed on the bypass passage, wherein
the second heat medium passage is constituted by a passage extending from the heat accumulator through the first heat medium supplying passage, the second heat medium supplying passage, the bypass passage, and the heat supplying passage to the heat accumulator.

3. The cogeneration system according to claim 2, further comprising:
   a flow rate detector disposed on a portion of the hot water supplying passage which portion is located on the heat load side of the mixing valve and configured to detect flow of the heat medium; and
   a controller, wherein
   the controller causes the bypass valve to close in a case where the flow rate detector detects the flow of the heat medium and open in a case where the flow rate detector does not detect the flow of the heat medium.

4. The cogeneration system according to claim 1, further comprising:
   a first heat medium supplying passage through which the heat medium is supplied from a heat medium source to the heat accumulator;
   a second heat medium supplying passage configured to branch off from the first heat medium supplying passage to be connected to the heat supplying passage; and
   a three-way valve disposed on a portion where the second heat medium supplying passage and the heat supplying passage are connected to each other, wherein:
   the three-way valve has two operating modes that are a mode A in which a portion of the heat supplying passage which portion is located on the heat accumulator side of the three-way valve and the second heat medium supplying passage are connected to a portion of the heat supplying passage which portion is located on the heat load side of the three-way valve and a mode B in which the portion of the heat supplying passage which portion is located on the heat accumulator side of the three-way valve and the second heat medium supplying passage are connected to each other and are not connected to the portion of the heat supplying passage which portion is located on the heat load side of the three-way valve; and
   the heat supplying passage is formed in a case where the three-way valve switches to the mode A, and the second heat medium passage is formed in a case where the three-way valve switches to the mode B.

5. The cogeneration system according to claim 4, further comprising:
   a heat demand detector configured to detect heat demand of the heat load; and
   a controller, wherein:
   the controller is configured to cause the three-way valve to switch to the mode A in a case where the heat demand detector detects the heat demand and switch to the mode B in a case where the heat demand detector does not detect the heat demand.

* * * * *